US010730585B2

(12) United States Patent
Braedt

(10) Patent No.: US 10,730,585 B2
(45) Date of Patent: Aug. 4, 2020

(54) MULTIPLE SPROCKET ASSEMBLY FOR A BICYCLE

(71) Applicant: Henrik Braedt, Hambach (DE)

(72) Inventor: Henrik Braedt, Hambach (DE)

(73) Assignee: SRAM DEUTSCHLAND GmbH, Schweinfurt (DE)

( * ) Notice: Subject to any disclaimer, the term of this patent is extended or adjusted under 35 U.S.C. 154(b) by 186 days.

(21) Appl. No.: 15/866,709

(22) Filed: Jan. 10, 2018

(65) Prior Publication Data
US 2018/0127056 A1 May 10, 2018

Related U.S. Application Data

(63) Continuation of application No. 15/062,714, filed on Mar. 7, 2016, now Pat. No. 9,902,463, which is a continuation of application No. 12/939,989, filed on Nov. 4, 2010, now Pat. No. 9,308,967.

(30) Foreign Application Priority Data

Nov. 4, 2009 (DE) .................. 10 2009 051 928
Jul. 15, 2010 (DE) .................. 10 2010 027 228

(51) Int. Cl.
B62M 9/10 (2006.01)
F16H 55/30 (2006.01)

(52) U.S. Cl.
CPC ............. B62M 9/10 (2013.01); F16H 55/303 (2013.01)

(58) Field of Classification Search
CPC .................................. B62M 9/10; F16H 55/303
See application file for complete search history.

(56) References Cited

U.S. PATENT DOCUMENTS

| 4,311,473 | A | * | 1/1982 | Sugimoto | B62M 9/10 192/64 |
| 5,194,051 | A | * | 3/1993 | Nagano | B62M 9/10 474/160 |
| 6,102,821 | A | | 8/2000 | Nakamura | |
| 7,344,463 | B2 | | 3/2008 | Reiter | |
| 7,854,673 | B2 | | 12/2010 | Oseto et al. | |
| 7,883,437 | B2 | | 2/2011 | Braedt | |
| 8,342,994 | B2 | * | 1/2013 | Braedt | B62M 9/12 474/164 |

(Continued)

FOREIGN PATENT DOCUMENTS

| CN | 1186752 A | 7/1999 |
| DE | 10260565 A1 | 7/2004 |

(Continued)

OTHER PUBLICATIONS

German Search Report dated Jun. 6, 2011, Application No. DE 10 2010 027 228.0, 5 pages.

(Continued)

Primary Examiner — Minh Truong

(57) ABSTRACT

A roller chain based drive train for a bicycle includes a sprocket assembly configured for mounting to a hub of a rear wheel of the bicycle. The sprocket assembly includes a smaller sprocket, a larger sprocket, and a plurality of pins connecting the smaller sprocket and the larger sprocket to each other. The pins are mounted in outer pin mount holes on the smaller sprocket and in the inner pin mount holes on the larger sprocket.

18 Claims, 8 Drawing Sheets

(56) References Cited

U.S. PATENT DOCUMENTS

| | | |
|---|---|---|
| 2003/0073531 A1 | 4/2003 | Tseng |
| 2003/0153423 A1 | 8/2003 | Smith |
| 2004/0121867 A1* | 6/2004 | Reiter .................. B62M 9/10 474/160 |
| 2005/0126409 A1 | 6/2005 | Schaffrath |
| 2005/0272546 A1 | 12/2005 | Reiter |
| 2008/0004143 A1 | 1/2008 | Kanehisa et al. |
| 2008/0058144 A1 | 3/2008 | Oseto et al. |
| 2008/0188336 A1 | 8/2008 | Tokuyama |
| 2008/0231014 A1 | 8/2008 | Braedt |
| 2009/0042681 A1* | 2/2009 | Dal Pra' .................. B62M 9/10 474/160 |
| 2009/0042682 A1 | 2/2009 | Dal Pra' et al. |
| 2009/0191996 A1 | 7/2009 | D'Aluisio |
| 2009/0215566 A1 | 8/2009 | Braedt |
| 2009/0243250 A1 | 10/2009 | Chiang |
| 2011/0130233 A1 | 6/2011 | Tokuyama et al. |
| 2017/0043840 A1 | 2/2017 | Reinbold et al. |

FOREIGN PATENT DOCUMENTS

| | | |
|---|---|---|
| DE | 102007010456 A1 | 12/2007 |
| DE | 102007006852 A1 | 4/2008 |
| DE | 102006057168 A1 | 6/2008 |
| DE | 102008010904 A1 | 8/2009 |
| EP | 1721823 B1 | 11/2006 |
| EP | 2045181 B1 | 4/2009 |
| JP | 59165293 | 11/1984 |

OTHER PUBLICATIONS

Taiwanese Official Letter and Search Report dated Jun. 25, 2015, Application No. TW 99134722, 6 pages.

* cited by examiner

MULTIPLE SPROCKET ASSEMBLY FOR A BICYCLE

This application is a continuation of U.S. patent application Ser. No. 15/062,714, filed Mar. 7, 2016, which is a continuation of U.S. patent application Ser. No. 12/939,989, filed Nov. 4, 2010, which claims priority to, and/or the benefit of, German patent application DE 102009051928.9, filed on Nov. 4, 2009, and German patent application DE 102010027228.0, filed on Jul. 15, 2010. The contents of which are included herein in their entirety.

BACKGROUND OF THE INVENTION

The present invention relates to multiple sprocket assemblies for bicycles, and more particularly, to a multiple sprocket assembly including a smaller sprocket and a larger sprocket connected by pins.

A multiple sprocket assembly mounted to a rear wheel is one of the main components of a drive train for mountain and racing bikes.

Multiple sprocket assemblies may include as many as eleven sprockets. The sprockets are highly loaded components and thus are subject to wear.

Conventional sprockets have an inner contour with a torque-transmitting profile that is mountable to a driver of a cassette hub or to an outer ring of a freewheel hub. The spacing between adjacent sprockets is critical for shifting the bicycle chain from one sprocket to the adjacent sprocket and is determined by how the torque-transmitting profile on the sprockets engage the driver or the outer ring of the freewheel hub. The sprockets are also subject to an undesirable bending load as a result of oblique chain tensile forces.

One development trend in multiple sprocket assemblies is weight reduction. This objective may be achieved, while still satisfying the mentioned basic requirements, by support elements such as spiders disposed between the sprockets and the driver. However, the achieved weight reduction is then limited.

To reduce lateral bending of individual sprockets, pins may be used to support the sprockets relative to each other. For example, the document JP 59-165293 discloses the use of such pins on a freewheel hub and documents, DE 10 2007 010 456 and DE 10 2007 006 852 disclose use of such pins on a cassette hub. Further, document DE 102 60 565 discloses a multiple sprocket assembly having a spider with a third sprocket riveted to the largest sprocket, in addition to the two sprockets.

The document EP 2 045 181 discloses a multiple sprocket assembly including individual sprockets radially supported on a driver and connected to each other by a spacer element. The individual sprockets are fastened to the spacer element. The connecting holes on the individual sprockets are determined by connecting holes on the spacer element.

Another approach to minimize weight is disclosed in document DE 10 2008 010 904. The individual sprockets are formed as one piece from a single blank by turning and milling operations. This involves a gradation of number of teeth with larger differences in the number of teeth, as it given priority during use for a mountain bike. The support structure of the sprocket assembly forms a hollow element in the shape of a cone. The sprockets are not supported on a "spider" adapter relative to a driver on the rear wheel hub. Instead, the hollow cone element contacts and is supported on the driver at two positions axially spaced from each. The hollow cone element includes annular support elements having an annular cylinder and an annular disc. Openings between the annular support elements permit passage of dirt and sludge. Dirt accumulation beneath the chain engaging on the sprocket can be avoided by these openings. Otherwise the chain would force dirt patches on the sprocket inward and compress and consolidate them there. The consolidated dirt accumulations can increasingly grow in the radial direction and increasingly force the chain outward until the chain no longer properly engages on the sprocket teeth and finally jumps off. Despite its very low weight, the support structure is sufficiently rigid and solid so that interfering larger deformations and breaks as a result of the drive force of the chain may be avoided.

One disadvantage of the above sprocket assembly is the high cost of manufacture by machining methods of turning and milling.

Accordingly there is a need for a multiple sprocket assembly having both reduced weight, satisfies the strength and rigidity requirements and is simple and cost-effective to manufacture.

SUMMARY OF THE INVENTION

The present invention provides a multiple sprocket assembly engageable with a roller chain and mountable to a driver of a rear wheel of a bicycle. The multiple sprocket assembly includes a smaller sprocket and a larger sprocket. Each of the smaller and larger sprockets has a radially outer ring with a plurality of teeth for engaging the roller chain. The radially outer ring has a plurality of radially outer pin mounts including a hole. The radially outer pin mounts are aligned with the teeth. The sprockets have a plurality of radially inner pin mounts connected to the radially outer ring forming a single piece. The radially inner pin mounts includes a hole. The radially inner pin mounts are aligned with the plurality of outer pin mounts disposed on an adjacent smaller sprocket. A plurality of pins connects the smaller sprocket and the larger sprocket to each other. The pins are mounted in the holes in the outer pin mounts on the smaller sprocket and in the holes in the inner pin mounts of the larger sprocket. A first mounting sprocket is connected to the smaller sprocket by pins and a second mounting sprocket is connected to the larger sprocket by pins. The first and second mounting sprockets are supported on the hub axle at two positions spaced apart in the axial direction of the hub axle.

In one embodiment of the present invention, the smaller and larger sprockets include a radially inner ring having circumferential connectors extending between at least two adjacent inner pin mounts. A radially outer edge of the hole in the outer pin mount may be disposed at a radial height of an outer base contour between adjacent teeth and an edge of the hole in the outer pin mount that is parallel to a load flank of the tooth is spaced from the load flank by a distance equal to about a diameter of the pin.

In one embodiment of the present invention, the radially outer ring is directly connected to the inner pin mount. In another embodiment, the larger and smaller sprockets include radial connectors extending between the radially outer pin mounts and the radially inner ring. One of the smaller and larger sprockets may include a radial support radially abutting the driver. The multiple sprocket assembly further includes an end sprocket having a number of teeth greater than a largest sprocket and a radial support radially abutting the driver. The end sprocket has a torque-transmitting profile engageable with the driver. The end sprocket may have an inner region, an outer region and connecting arms disposed between the inner and outer regions. The connecting arms may be sloped in the drive direction of rotation between the outer region and the inner region. The inner region may have openings and inner arms sloped from radially outward to radially inward in the drive direction of rotation.

In one embodiment of the present invention, the pins are interference fit. Alternatively, the pins may be glued or welded to the sprockets. The pins 7 may have a support collar in their axial direction. The pins may include at least one beveled end. The beveled end of the pin may protrude beyond a face of the larger sprocket. An end of the pin on the smaller sprocket may be flush with a face of the smaller sprocket. The beveled end of the pin may protrude beyond a face of the smaller sprocket.

These and other features and advantages of the present invention will be more fully understood from the following description of one or more embodiments of the invention, taken together with the accompanying drawings.

DETAILED DESCRIPTION

Figure 1:
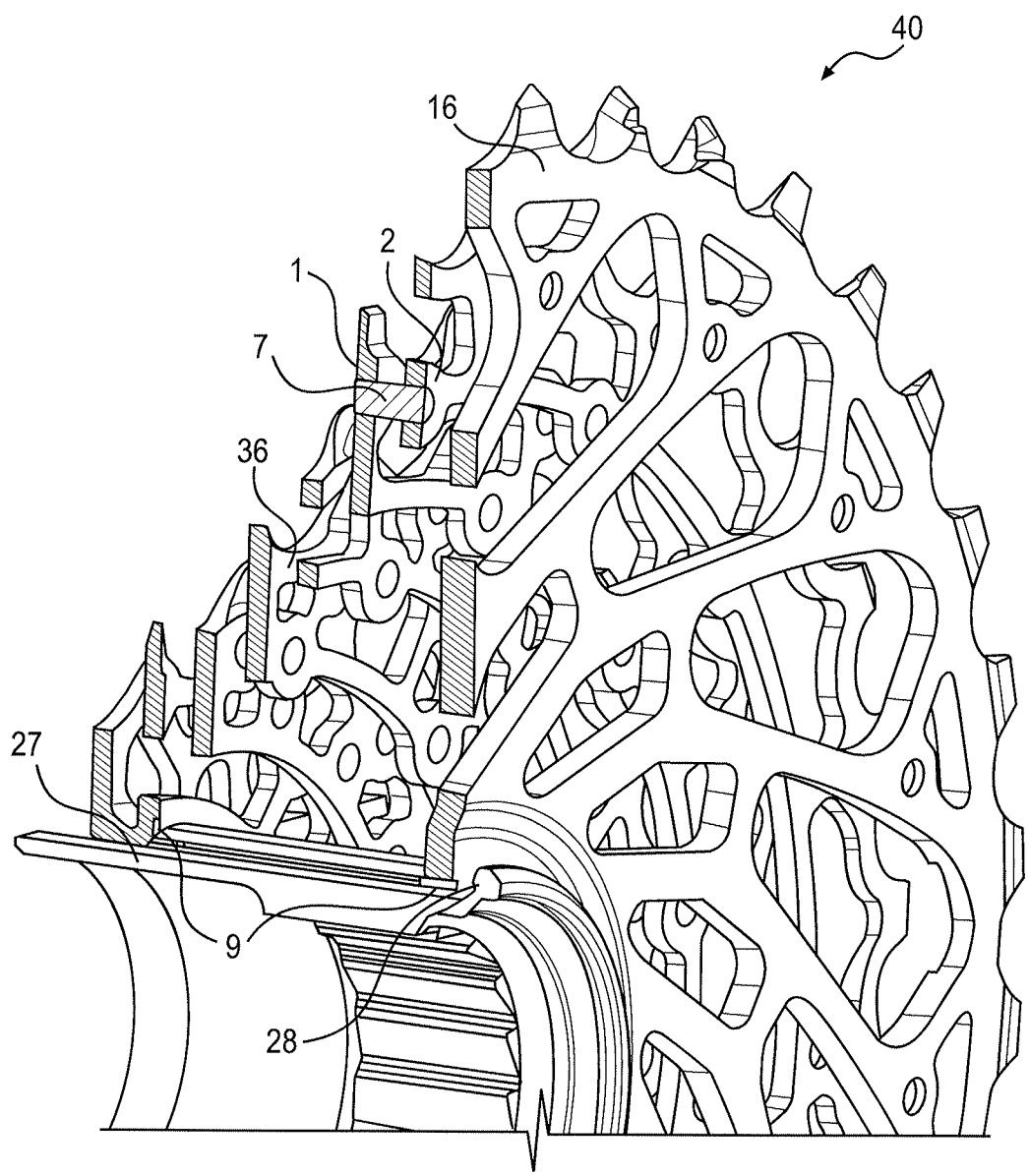
FIG. 1 is a partial cross-sectional view taken along the axis of rotation of a multiple sprocket assembly according to one embodiment of the present invention.
Figure 2:
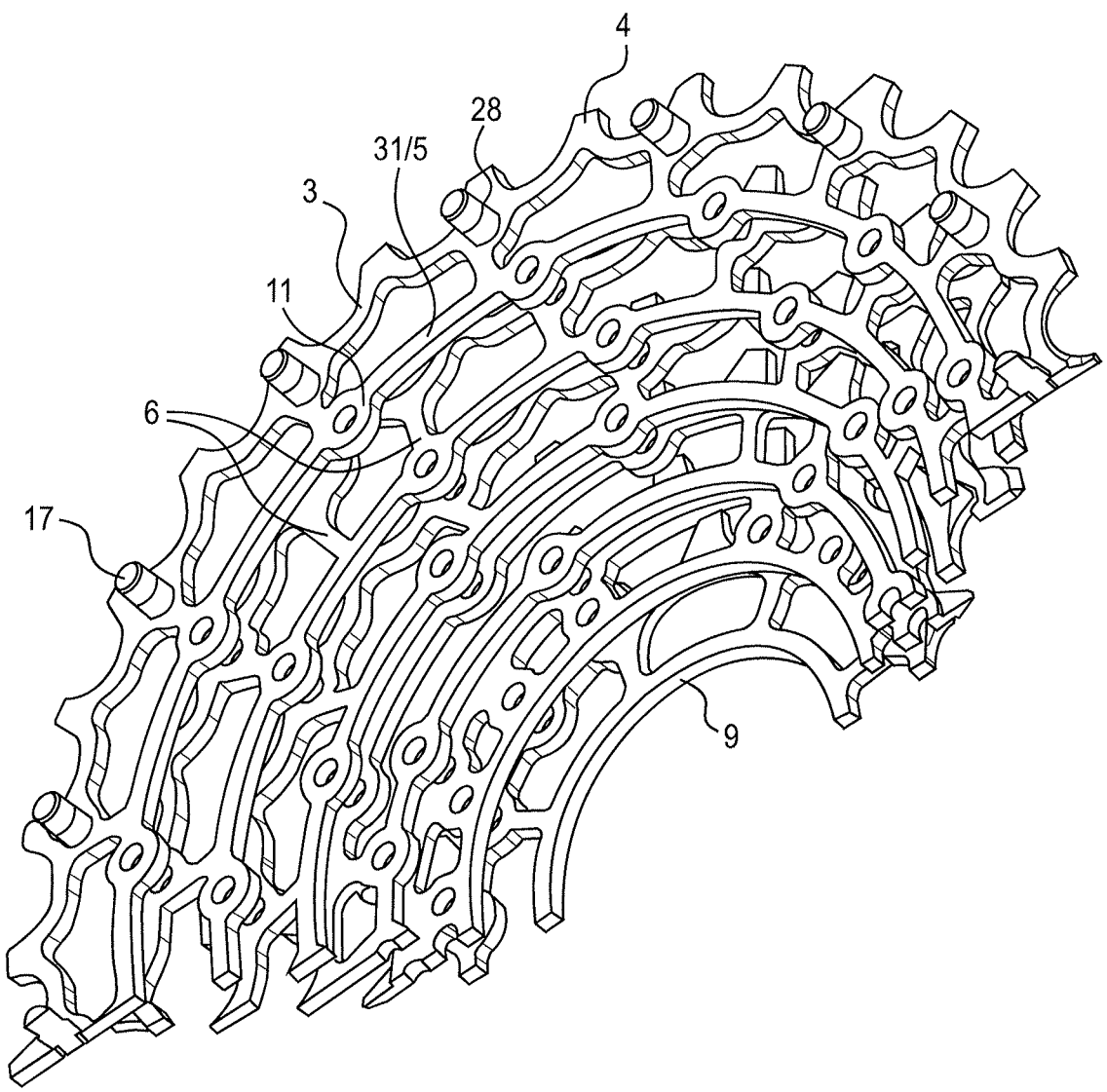
FIG. 2 is a partial perspective view of FIG. 1 viewed from the face of a largest sprocket without pins between the sprockets.

FIGS. 1-9 illustrate a multiple sprocket assembly according to one embodiment of the present invention. The multiple sprocket assembly may include a plurality of individual sprockets as shown in FIGS. 1 and 2. FIGS. 3-6, 8 and 9 show a smaller sprocket and/or a larger sprocket to more easily illustrate their relationship. The smaller and larger sprockets have substantially the same design. Sprockets can be viewed as a larger or smaller sprocket depending on the next smaller or larger sprocket additionally being considered.

FIGS. 1 and 2 shows the multiple sprocket assembly 40 mounted on a driver 27 of a cassette hub in a longitudinal section along the axis of rotation. The multiple sprocket assembly 40 includes an end sprocket 16 having the largest number of teeth and having a different configuration than the other sprockets. The entire multiple sprocket assembly is supported on radial supports 9 extending radially from a rotational axis of driver 27 and sprockets 1, 2 on the driver 27. Preferably, the radial supports 9 are disposed on the end sprocket 16 and on the smallest sprocket. Alternatively, the radial supports 9 may be disposed on other sprockets which then the radial supports are formed as support sprockets. The sprocket assembly in the axial direction is disposed on a stop 28 of the driver 27. Pins 7 connect sprockets 1, 2. The entire sprocket assembly may also be mounted on an outer ring of a freewheel hub, which is mounted to rotate in the backward direction of rotation relative to an inner ring of the freewheel hub and has a freewheel mechanism between outer and inner rings.

The multiple sprocket assembly also includes floating sprockets 36 which are not supported on the driver and not mounted to adjacent sprockets supported on the freewheel driver. The floating sprocket is supported by a first sprocket supported directly on the driver and a second sprocket mounted on the first sprocket.

Figure 3:
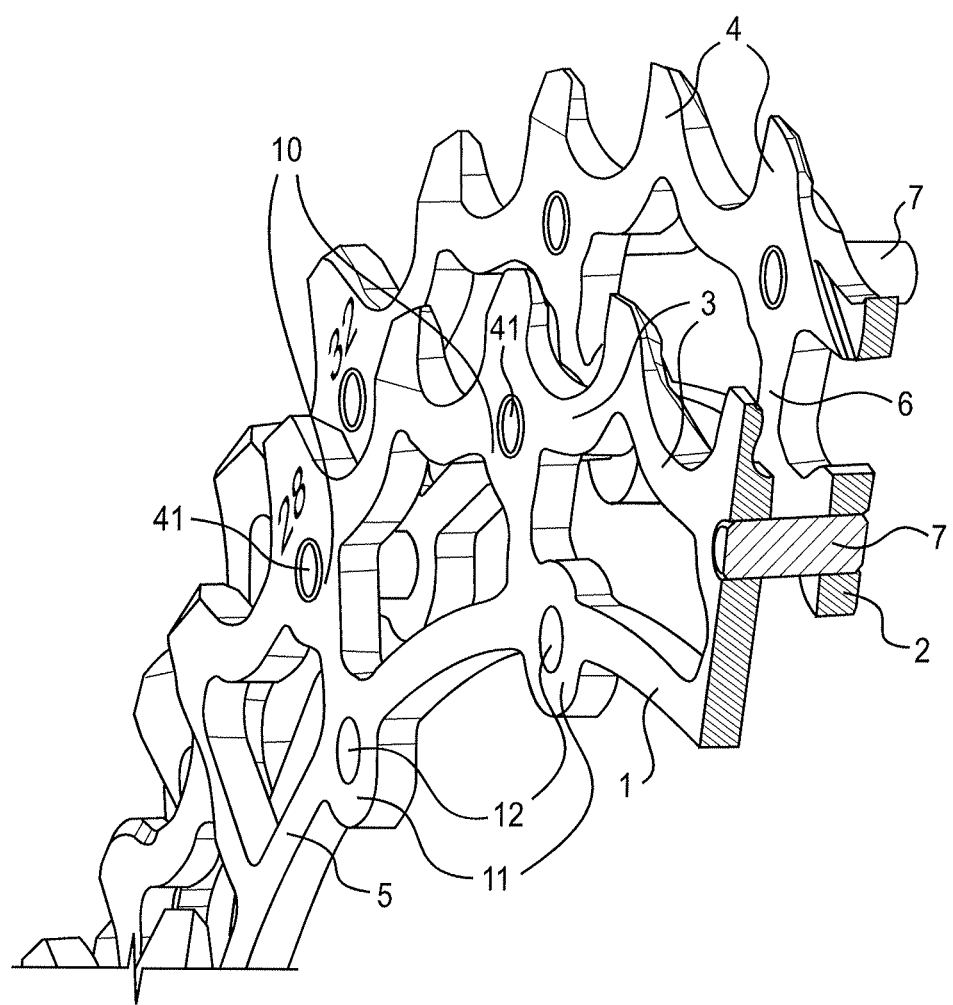
FIG. 3 is a partial view of the sprocket assembly of FIG. 2 showing sprockets with 28 and 32 teeth.
Figure 4:
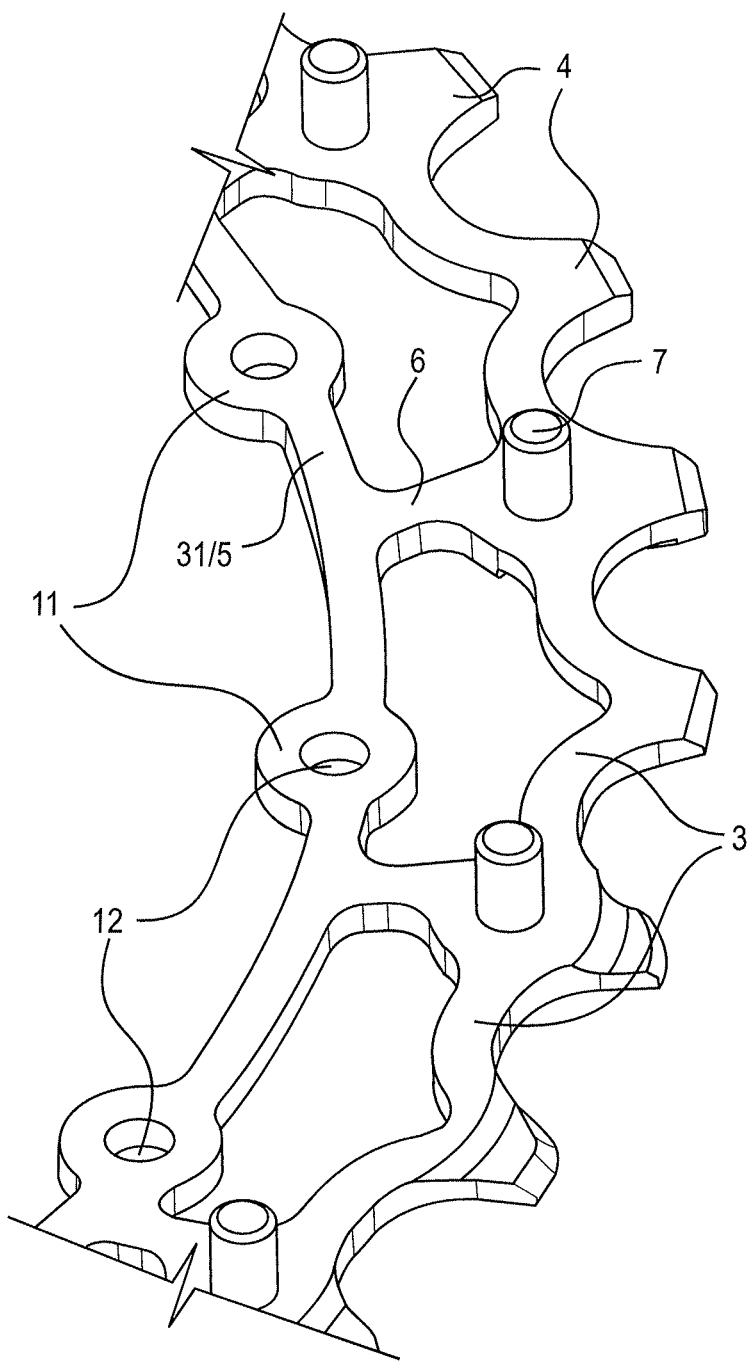
FIG. 4 is a partial view of the sprocket assembly of FIG. 1 showing a pin connection between a smaller sprocket and a larger sprocket in detail, viewed from the face of the larger sprocket.
Figure 6:
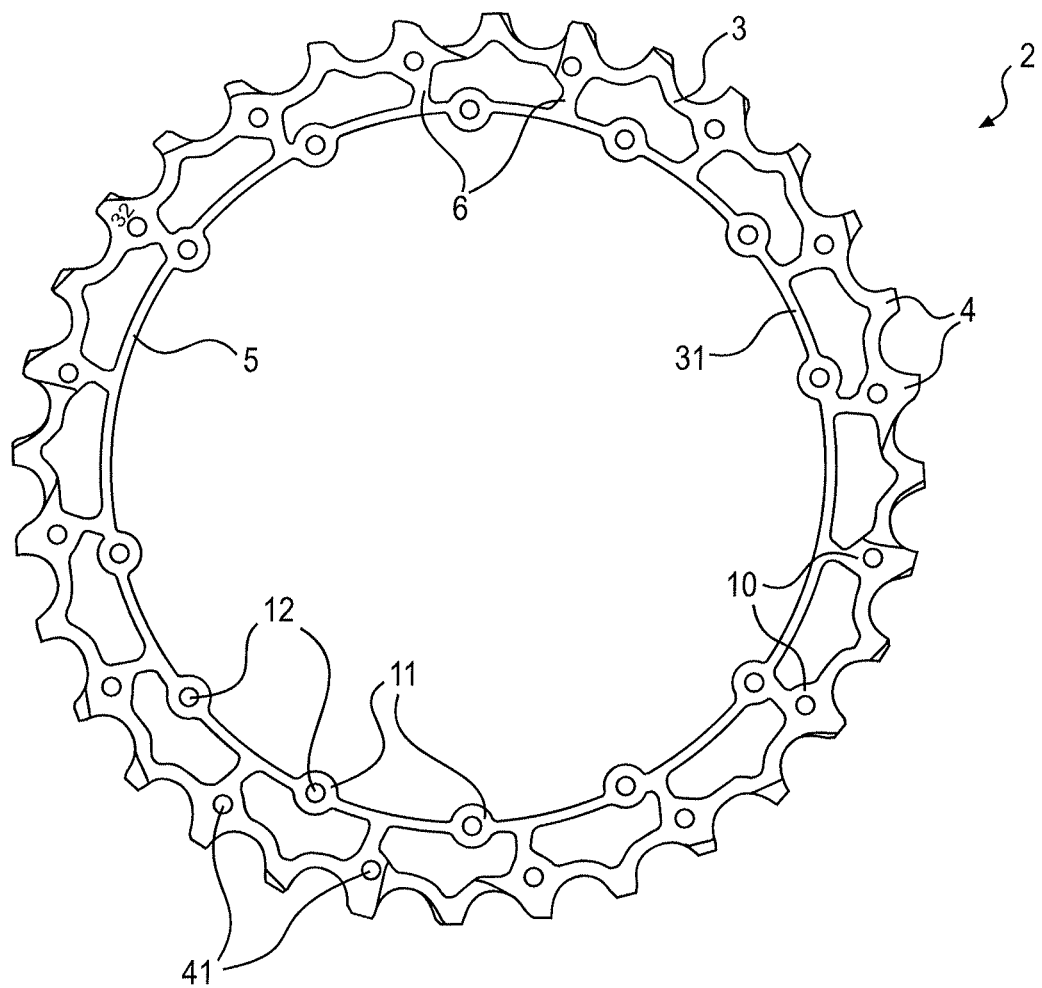
FIG. 6 is a front view of the larger sprocket.
Figure 7:
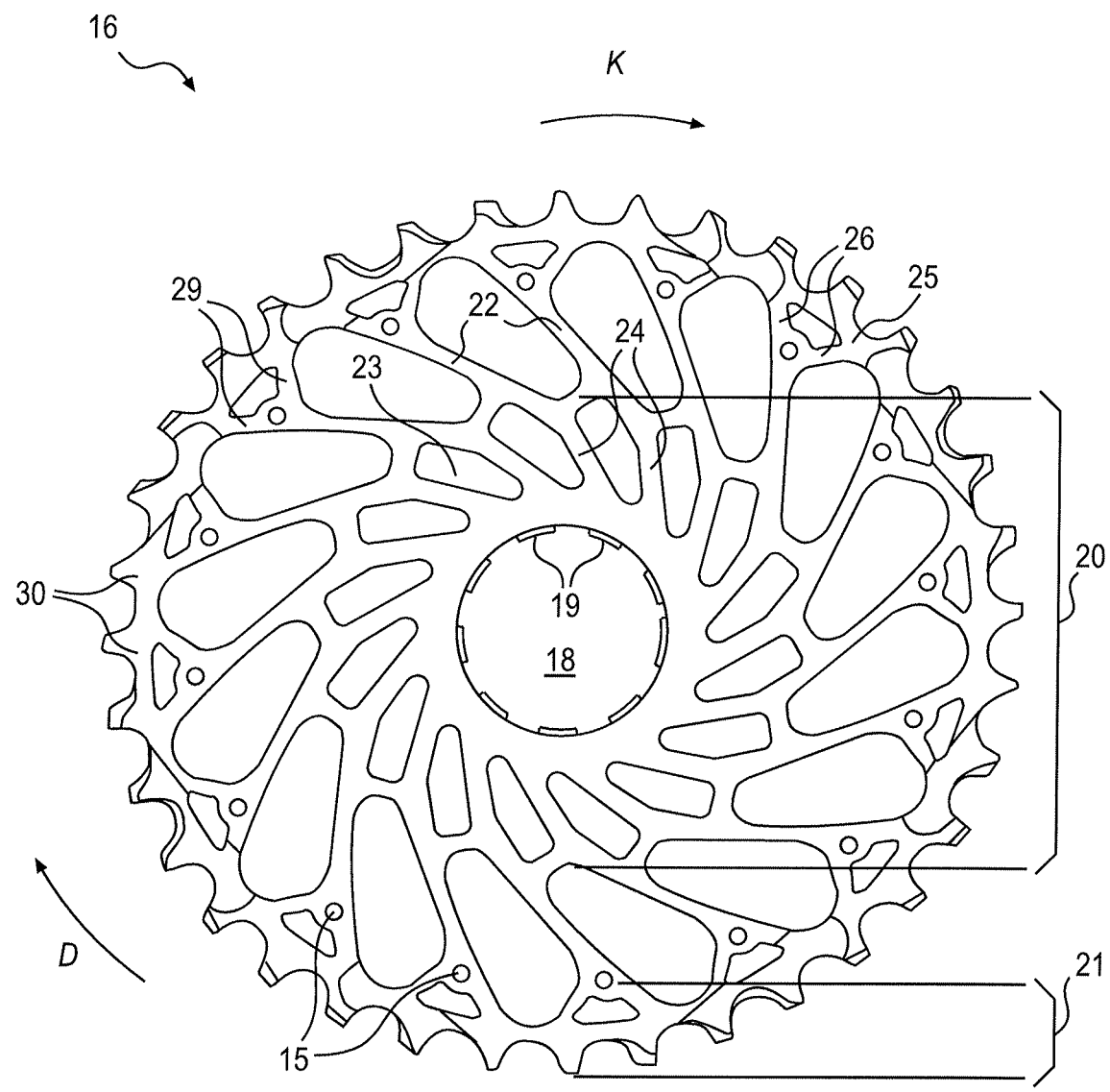
FIG. 7 is a front view of an end sprocket of FIG. 1.

Looking to FIGS. 3, 4 and 6, the smaller sprocket 1 is connected to the larger sprocket 2 by the pins 7. The smaller and larger sprockets 1, 2 include inner and outer rings 5, 3. The inner ring 5 includes inner pin mounts 11 having holes 12. The holes 12 of the inner pin mounts 11 receive the pin of the next smaller sprocket. In the circumferential direction adjacent inner pin mounts 11 are connected by circumferential connectors 31. The outer ring 3 includes outer pin mounts 10 having holes 41. The inner and outer rings 5, 3 are connected by radial connectors 6 radially extending between the outer pin mounts 10 and the inner ring 5.

The outer ring 3, radial connectors 6 and the inner ring 5 provide rigidity to sprocket to prevent ovalization or deformation of the sprocket in the radial direction. The inner ring 5 need not be closed and may also consist of individual separate segments in the circumferential direction. The radial connector 6 may also radially extend from the inner pin mount 11 to the outer ring 3.

Figure 5:
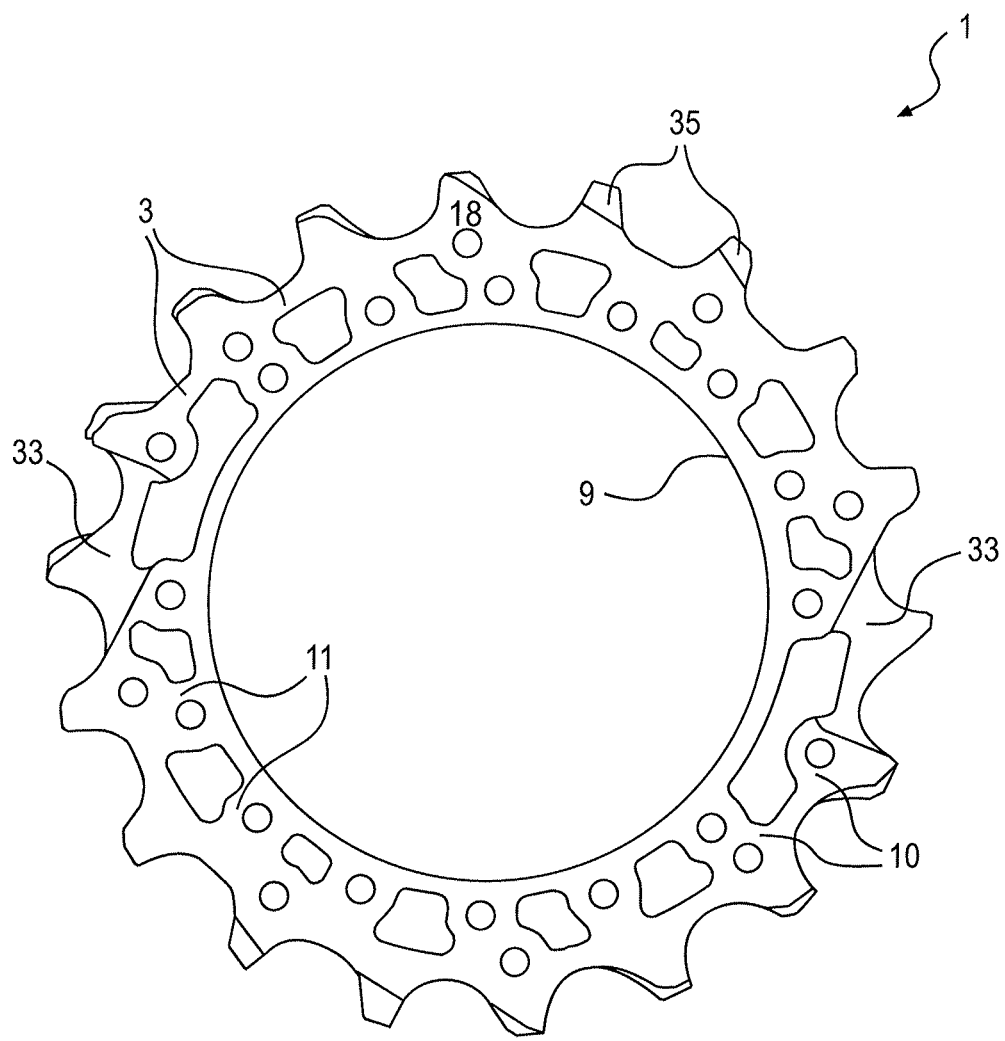
FIG. 5 is a front view of the smaller sprocket.

Looking to FIG. 5, the inner pin mounts 11 of a sprocket having a small tooth difference relative to the adjacent smaller sprocket are disposed such that the radial connectors 6 are eliminated and the inner ring 5 is directly connected to the outer ring 3. The inner pin mounts 11 may be connected to the outer pin mounts 10 or the outer ring 3.

The inner ring 5 has a substantially circular shape with a substantially equal ring width in the radial direction. The inner ring 5 may have a polygon shape, if the circumferential connectors 31 have a straight trend between the inner pin mounts 11. The outer ring 3 has a band-like shape and substantially the same width in the radial direction. The outer contour of the band is determined by the shape of the teeth and the inner contour of the band substantially follows the outer contour at equal spacing. A different spacing is found wherever outer pin mounts are provided on the outer ring 3 with a concentric hole 41 for receiving the pin 7 and wherever strongly asymmetric teeth are present. These outer pin mounts 10 are disposed radially within teeth 4 and symmetric to the contour of the teeth 4 and are therefore integrated in the outer ring 3. This allows the pins 7 to be disposed radially outward while maintaining sufficient material of the teeth 4. If these outer pin mounts 10 were to be arranged radially beneath tooth bases of teeth 4, they would have to be positioned farther radially inward to still maintain a minimum spacing at the contour of the tooth base.

It is advantageous to position the outer pin mounts 10 as far radially outward as possible because a shorter lever arm of contact forces caused by a roller of the roller chain engaging the tooth is obtained. In this way it is also made possible to convey dirt adhering to the sprockets on the outside and on the pin 7 radially inward without collection of dirt and its consolidation by pressure forces from the roller chain. The outer pin mounts 10 can only be placed far enough radially outward so that the pins 7 inserted into holes 41 do not collide with the outer and inner plates of the roller chain, which laterally pass the tooth 4 during engagement of the roller chain. A small radial intermediate space between pin 7 and chain plate of the roller chain is provided.

Preferably, the outer pin mounts 10 are aligned with every second tooth 4. However, not true when the sprocket has an odd number of teeth or when shifting aids are provided in the form of recesses on the teeth. On very small individual sprockets outer pin mounts 10 are consequently aligned to a larger number of teeth.

Additional sprockets can be arranged between the described smaller sprocket 1 and the larger sprocket 2. If precisely one additional middle sprocket is present, this is a triple arrangement. In this triple arrangement the middle sprocket and the adjacent smallest sprocket, on the one hand, and the largest sprocket and the adjacent middle sprocket, on the other hand, have the same ratios with reference to arrangement of pin 7 and the conditions of connection. They are also constructed and act together just like the arrangement of the smaller sprocket 1 and the larger sprocket 2 described above.

When a width of the band on the outer ring 3 and a width of ring on the inner ring 5 are approximately equal to the material thickness of the sprocket, a favorable compromise with respect to the lowest possible weight and good manufacturing characteristics is reached. Favorable conditions are likewise obtained if the diameter of the pin 7 corresponds to about 1 to 1.5 times the material thickness of the sprocket. The material thickness of a sprocket for a mountain bike is about 2 millimeters and the material thickness of a sprocket for a racing bike is about 1.6 to 1.8 millimeters.

The pin mounts 10, 11 must offer the pin 7 a secure hold, which is present when the diameter of the pin hole is chosen at about three times the diameter of pin 7. A pin with a diameter of 2.5 millimeters is sufficiently rigid and fractureproof. The position of the pin 7 in outer ring 3 is symmetric to the tooth 4 such that the tooth 4 yields elastically during engagement of the chain roller. This configuration results in the tensile force from the chain being distributed to a larger number of teeth, which increases the maximum possible chain tensile force and reduces wear on the teeth. The hole 15 on the end sprocket 16 (see FIG. 7) arranged between two teeth 4 with outer pin mount 10 without a pin hole are suspended even more flexibly on the adjacent teeth 4 so that here the effect of distribution of chain tensile forces to several teeth no longer has an effect. In addition, a distribution of forces to several elements of the support structure is produced on this account and therefore the individual elements of the support structure are even less loaded.

The pins 7 may be provided with or without support collars 34, which offer the pins 7 a secure support in the longitudinal direction during assembly and use. By selecting an oversize between the diameter of the pin 7 and the inside diameter of the hole it can also be made possible that when the pin 7 is pressed into the hole a peripheral bulge of limited height is produced which acts as a support collar. Finally, the multiple sprocket assembly in the assembled state can be provided with surface coating so that the area of the pin 7 acquires a dimension outside the hole that also acts as a support collar 34 and prevents the pin 7 from moving in the longitudinal direction during use and prevents movement of the individual sprockets 1, 2 toward each other in the axial direction. In order for the sprockets not to be able to move away from each other in the axial direction the radially inward supporting sprockets are biased toward each other in the axial direction by corresponding stops on the driver or on the outer ring of a bearing, on the one hand, and an end screw (not shown).

A radial support 9 for driver 27 is provided on a smaller sprocket of a group of sprockets radially inward on inner ring 5 in order to radially support the sprocket group on one side. On the largest sprocket of the sprocket group an end sprocket 16 is mounted which radially supports the sprocket group on the other axial side. The end sprocket 16 satisfies several tasks with respect to fixation of the multiple sprocket assembly and transfer of the torque coming from the chain to the driver.

Looking to FIG. 5, the individual sprockets have shifting aids or recesses 33 on the flat surfaces and tooth bevels 35 on the teeth. The recesses 33 are components of a shifting lane along which the shifting chain moves from a smaller sprocket to a larger sprocket and also during the reverse shifting process. The recesses 33 offer the chain links space, which is not provided at other positions on the sprocket. Deliberate shifting only at favorable positions is therefore executed. The tooth bevels serve not to allow the chain deflected by the chain guide of the derailleur in the axial direction to engage on the corresponding tooth. No pin holes are provided within the recesses 33. Wherever possible, the recess is reduced so that the hole is not positioned in the recess 33.

Looking to FIG. 2, a number of end pins 17 are disposed between the larger sprocket 2 and the end sprocket 16. Their position is again determined by the position of the teeth on the larger sprocket 2, which in the arrangement of a larger sprocket 2 and end sprocket 16 is viewed as the smaller sprocket and therefore stipulates the position of the pin mounts. Looking to FIG. 7, the end sprocket 16 includes a central opening 18 in which the driver 27 is inserted during assembly of the multiple sprocket assembly. The opening includes a torque transmitting profile or splines 19 to transfer torque between the end sprocket 16 and driver as a result of the chain tensile forces K engaging on a sprocket.

The end sprocket 16 has an inner region 20, an outer region 21 and connecting arms 22. The connecting arms 22 extend between the outer region 21 and the inner region 20 and are aligned deviating from the radial direction in the drive direction of rotation D. Because of this they are acted upon by pressure and their maximum possible length is determined by the pressure force to be taken up by them, which must lie below their critical buckling load.

The inner region 20 can therefore have a greater width in the radial direction. For weight reduction, openings 23 are provided so that inner arms 24 acted upon by pressure are also formed. The outer region 21 can be configured differently. If it is designed as a ring, it is provided with a continuous groove on the flat side of the sprocket in order to save weight and in order to bring the rigidities of the radially outer end tooth ring 30 and the radially inner part of the outer region 21 provided with teeth 4 into a favorable ratio.

In another embodiment of the outer region 21, two additional arms 29 are provided between the connecting arm 22 and the end tooth ring 30. At the points of entry of the two additional arms 29 into the connecting arm 22, holes 15 are provided to receive end pins 8. These pins 8 can have a greater diameter than the pin 7 for connection of the other larger and smaller sprockets 1, 2 in order to offer these end pins 8 sufficient hold in the end sprocket 16, which can be made from aluminum.

The end sprocket 16 may be flat or the inner region 20 is offset in the axial direction relative to the outer region 21 to bring the teeth 4 on the end sprocket 16 closer to the spokes of the wheel so that greater design space can be furnished for a larger number of sprockets. On the inside periphery of opening 18 the end sprocket 16 has splines 19. These can protrude in the axial direction beyond the flat surfaces of the end sprocket in order to obtain optimal engagement conditions between the end sprocket and driver. The end sprocket must have sufficiently high stability against keying, i.e., against deformation of the central area in the axial direction from the plane of extent of the end sprocket 16, otherwise unduly large deformation would occur with the laterally engaging chain forces. The described end sprockets can also be used in conjunction with a one-piece multiple sprocket arrangement according to DE 10 2008 010 904 mentioned in the introduction.

The splines 19 can also be arranged on the smaller sprocket 1, specifically as an alternative or in addition to the described splines on the end sprocket 16. However, preferably the splines are on the end sprocket 16. If the splines 19 are disposed on the end sprocket and additionally on the smaller sprocket 1, it may happen that in the extreme case all forces are transferred from the sprockets to the driver only through the smaller sprocket. An increased manufacturing and assembly expense would therefore occur without a gain in safety during contact with the driver.

If the splines 19 are disposed only on the smaller sprocket 1, local overloads may then occur because individual radial connectors 6 and sections in the outer ring 3 or in the inner ring 5 are overloaded. With the splines 19 disposed only on the end sprocket 16, inner region 20 of the end sprocket 16 has greater stability for transfer of contact forces to the driver. A distribution of loads to several splines is obtained. If forces introduction on the multiple sprocket assembly occur by engagement of the chain on one of the sprockets spaced from the end sprocket 16, the forces are then distributed to several components of the support structure and are therefore also distributed to several connecting arms 22. The elements of the support structure on the end sprocket 16 are also already designed more stable anyway. Overall this leads to a more noncritical load distribution.

The pins 7 already have bevels 52 on their ends for manufacturing reasons and do not have sharp edges. If the end pins had a sharp edge, a burr may be present which would be an obstacle during pressing in of the corresponding the pin 7 into the holes 41, 12 of the pin mounts 10, 11, respectively. Sharp-edge pin ends therefore fail. The bevels 52 facilitate threading of the end of pin 7 into holes 41, 12 of the pin mounts 10, 11, respectively. On the other hand, lower overlap between the outer surface of the pin 7 and the inner surface of the holes 41, 12 in the pin mounts 10, 11 occurs on the sprocket 1, 2. This lower overlap reduces the quality of the sprocket-pin connection with respect to the strength and lifetime even with the forces to be transferred by the sprocket-pin connection alternating between maximum and minimum values.

Figure 8:
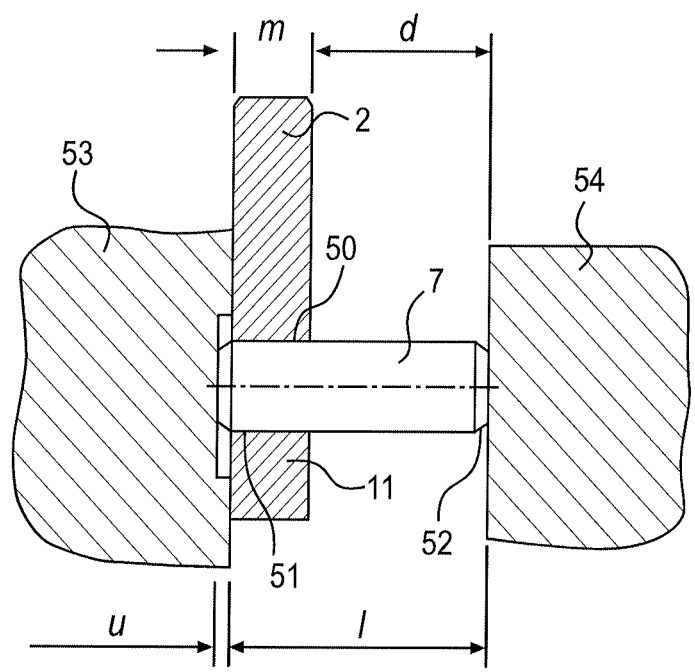
FIG. 8 is a cross-sectional view showing the pin being pressed into a larger sprocket.
Figure 9:
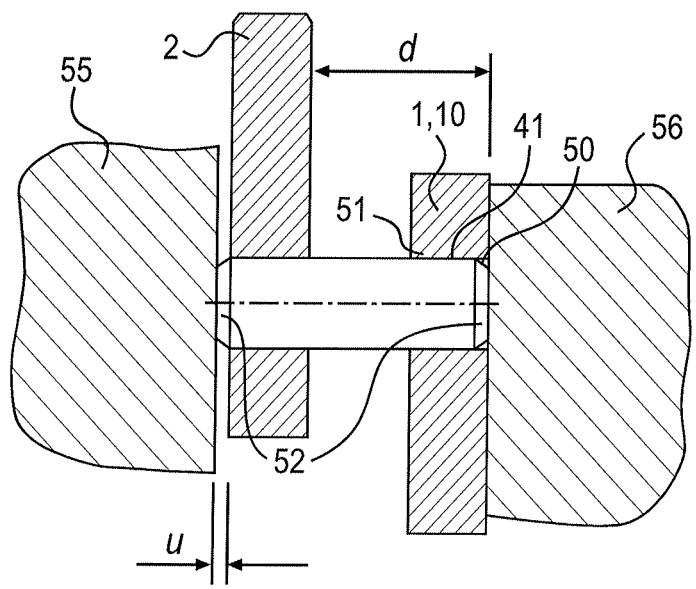
FIG. 9 is a cross-sectional view showing the smaller sprocket being pressed onto the pin on the larger sprocket.

The holes 41, 12 in the sprockets 1, 2 also do not have a sharp-edge on their two ends. Because of the punching direction during punching out of sprockets 1, 2, an unavoidable bevel 50 exists on one side, which appears as a continuous inner bevel. As a result of shifting aids that are present in a larger extent on the side of the sprocket 2 facing the next smaller sprocket 1, a punching direction is chosen that produces on the side facing the next larger sprocket 2 a sharp edge end 51 of hole 12 and on the side facing the next smaller sprocket 1 a hole 12 with a bevel 50, as shown in FIGS. 8 and 9.

To ensure proper engagement of roller chain 13 with the teeth of the sprockets during a shifting process, a precise and defined sprocket spacing d of the sprockets between the sides of sprockets 1, 2 facing the next smaller sprockets is necessary. However, since the material thicknesses of the individual sprockets for reasons of manufacture vary, irregularities in sprocket spacing d may occur during assembly of the sprocket assembly. If several sprockets are combined, their tolerances can be added up. Consequently, depending on the number of sprockets, the distance from the largest to smallest individual sprocket can deviate up to a millimeter from the target dimension as a result of sprocket thickness tolerances. This distance then does not permit proper engagement of the chain on the sprocket teeth and also hampers the shifting process.

If during assembly of several individual sprockets by means of the pins to an assembly unit the flat surface facing the next smaller sprocket is used as a reference surface, a further complication results. This surface is only suitable with considerable restriction as a support surface on an assembly device during the joining of several sprockets 1, 2 by pins 7. Starting from there, shape elements are preferably arranged that serve as shifting aids. These give the chain changing from one to another sprocket room to run on and run off. The more shape elements are present, the less contact surface remains for assembly. For this purpose an assembly device must be constructed at great expense, which can be used as a matching counter piece when little support surface is present and which withstands the high pressure loads that are exerted pointwise.

In order to get around the problem of added tolerances, the different possible material thicknesses m of the individual sprockets 1, 2 must already be balanced or compensated during assembly. This compensation can be implemented by two simple and cost-effective method steps, by means of which the requirement for a complicated assembly device also drops out.

Looking to FIG. 8, first the pin 7 is pressed by a first tool 54 through one end of holes 12 in the inner pin mounts 11 of inner ring 5 of the larger sprocket 2 in axial direction until a defined overhang u is formed on the opposite side of the sprocket 2. Preferably, the size of the overhang u equals the height of the bevel on the end of the pin 7. The larger sprocket 2 is supported by a first support 53.

In this process the fact is exploited that production of pins with very narrow length tolerance is possible. In addition, this method also profits from the discussed property of holes 12 which can have a sharp-edge or a bevel. It has proven to be particularly advantageous to press the pins into the hole end having the bevel.

If, in the alternative embodiment, a pin 7 was only pressed through the hole 12 in the inner pin mount 11 from the side with the bevel 50 in the axial direction until the top of the pin were flush with the back of the sprocket, in which case there would be no overhang u, owing to the bevel of the pin 7 in addition to the bevel, there would be less pressing-in or contact surface between the pin 7 and the surface of the hole 12 of the inner pin mount 11. In this case there would be a greater risk that a pin 7 would loosen from the hole 12 of the inner pin mount 11 through the shear forces that fluctuate between maximum and minimum values and threaten the stability of the sprocket assembly. If, however, pin 7 is pushed out beyond the flat surface of the larger sprocket, the connection gains strength not only via the greater overlap and contact surface. The sharp-edge punch contour 51 of hole 12 of inner pin mount 11, which is now in contact with the smooth pin 7, also ensures the largest possible overlap on the sprocket-pin connection and good fixation of the pin 7 in hole 12. Loosening or migration of pin 7 out of hole 12 of inner ring 5 is suppressed with this first pressing-in step in a simple manner in the form of force fitting over the maximum possible length and sufficient strength of the connection from pin 7 and the larger sprocket 2 is guaranteed. The overhang of this sprocket pin connection therefore produces an improvement in stability and strength that could not possibly be better because of the maximum possible overlap. On the side of the mentioned sprocket 2 facing the next smaller sprocket 1, the pressing-in conditions cannot be further optimized, since the hole necessarily has a bevel, which already by itself means a reduction in overlap.

The material thickness m has a direct effect on the sprocket spacing d in addition to the distance L between the tools. When the distance L between the tools for pressing-in is retained during the first assembly step, different sprocket spacings are obtained with varying material thicknesses.

The material thickness m can preferably be varied from one material batch to another, more rarely within one material batch. In order for the same sprocket spacing d to be achieved during a change in material thickness m, this must be controlled against by a corresponding change on the tools in the first assembly step. The distance dimension L is then changed.

Another advantage of the first method step with the creation of a defined overhang u is that the protrusion of pin 7 which occurs on the other side can be used as a support and contact surface for further pressing in the next method step.

Looking to FIG. 9, in a second step, a next smaller sprocket 1 is connected to the larger sprocket 2 from step 1. The concentric holes 41 of the outer pin mounts 10 of the outer ring 3 of the smaller sprocket 1 are joined to the pins and pressed onto them by a second tool 56. The smaller sprocket 1 is pressed relative to the larger sprocket 2 in the axial direction until the ends of the pins are closed off flush with the ends of the holes 41 in the smaller sprocket 1. As is apparent from FIG. 9, the punch contour with bevel 50 is then situated on the axial position of bevel 52 on pin 7. The larger sprocket 2 is supported on a second support 55.

If, in an alternative embodiment, the pin end extended beyond the hole, no additional overlap could be gained. This position assignment of the pin end and hole therefore also generates the maximum possible overlap with the maximum possible strength.

The pressing-in conditions on the end of hole 12 facing the next larger sprocket 2 also cannot be further optimized, since the sharp-edge hole 51 already has optimal overlap with the smooth pin section.

By means of these two simple method steps the sprockets can be joined and firmly adjusted cost-effectively. The required spacing d between the sprockets 1, 2 measured from the outer surface of the larger sprocket 2 to the outer surface of the next smaller sprocket 1 is maintained. This method keeps the deviations minimal, an added deviation is tolerably small and reliable connection between pin 7 and hole 12 of the inner pin mount 11 is made possible.

In a modified form of the sprocket assembly according to the invention it would also be possible to provide holes provided with bevels on the side allocated to the adjacent larger sprocket.

According to the described procedure, additional pins are pressed in an individual sprocket or a preassembled arrangement of several sprockets and then another individual sprocket is pressed onto these pins. It would also be possible to press pins into an individual sprocket and then press a preassembled arrangement of several sprockets onto these pins. The individual sprockets into which the pins are pressed, would then be the smaller sprocket.

While this invention has been described by reference to one or more embodiments, it should be understood that numerous changes could be made within the spirit and scope of the inventive concepts described.

Accordingly, it is intended that the invention not be limited to the one or more disclosed embodiments, but that it have the full scope permitted by the language of the following claims.

What is claimed:

1. A sprocket assembly for mounting to a hub of a rear wheel of the bicycle comprising:
   a first radial support and a second radial support, the first radial support being included in an end sprocket comprising an inner region and an outer region, the inner region comprising an opening having a torque transmitting profile, the second radial support formed as a part of at least one other sprocket of the sprocket assembly;
   a plurality of floating sprockets disposed between the end sprocket and the at least one other sprocket, the plurality of floating sprockets connected to the end sprocket and the at least one other sprocket by pins extending between at most two adjacent sprockets.

2. The sprocket assembly of claim 1, wherein the sprockets of the plurality of floating sprockets comprise a radially inner ring of pin mounts and a radially outer ring of pin mounts configured to receive the pins.

3. The sprocket assembly of claim 2, wherein the radially inner ring comprises the plurality of inner pin mounts, and the radially inner ring has circumferential connectors extending between at least two adjacent inner pin mounts.

4. The sprocket assembly of claim 3, wherein the plurality of floating sprockets comprise a larger sprocket and a smaller sprocket.

5. The sprocket assembly of claim 4, wherein the larger sprocket comprises direct connections between the inner pin mounts of the inner ring and the outer ring.

6. The sprocket assembly of claim 1, wherein the end sprocket has a number of teeth greater than the other sprocket.

7. The sprocket assembly of claim 1, wherein the end sprocket has a largest number of teeth of all sprockets of the sprocket assembly.

8. The sprocket assembly of claim 1, wherein the plurality of floating sprockets are configured to not contact the hub or a driver.

9. The sprocket assembly of claim 1, wherein the pins are interference fit into holes of the floating sprockets.

10. The sprocket assembly of claim 1, wherein the pins are one of glued and welded to the floating sprockets.

11. The sprocket assembly of claim 1, wherein the pins have a support collar in their axial direction.

12. The sprocket assembly claim 1, wherein the end sprocket further comprises connecting arms disposed between the inner region and the outer region.

13. The sprocket assembly of claim 12, wherein the connecting arms are separated by vacancies in the end sprocket.

14. The sprocket assembly of claim 12, wherein the connecting arms are sloped in the drive direction of rotation between the outer region and the inner region.

15. The sprocket assembly of claim 1, wherein the pins include at least one beveled end.

16. The sprocket assembly of claim 15, wherein the beveled end of the pin protrudes beyond a face of a sprocket of the plurality of floating sprockets.

17. The sprocket assembly of claim 15, wherein the beveled end of the pin protrudes beyond a face of a sprocket of the plurality of floating sprockets.

18. The sprocket assembly of claim 1, wherein the plurality of floating sprockets are not supported on a driver and not mounted to adjacent sprockets supported on the driver.

* * * * *